(12) United States Patent
Hu

(10) Patent No.: US 6,766,904 B2
(45) Date of Patent: Jul. 27, 2004

(54) CD BOX WITH RETAINING STRUCTURE

(76) Inventor: Wen-Long Hu, No. 22-2, Alley 51, Lane 195, Kuang Hsin Rd., Pa Te City, Tao Yuan Hsien (TW)

(*) Notice: Subject to any disclaimer, the term of this patent is extended or adjusted under 35 U.S.C. 154(b) by 99 days.

(21) Appl. No.: 10/190,679

(22) Filed: Jul. 9, 2002

(65) Prior Publication Data

US 2004/0007482 A1 Jan. 15, 2004

(51) Int. Cl.$^7$ ............................................. B65D 85/57
(52) U.S. Cl. ..................... 206/310; 206/308.1; 206/493
(58) Field of Search ............................. 206/310, 308.1, 206/309–311, 312, 313, 493, 815, 232

(56) References Cited

U.S. PATENT DOCUMENTS

| | | | | |
|---|---|---|---|---|
| 5,685,425 A | * | 11/1997 | Choi | .......................... 206/310 |
| 6,227,362 B1 | * | 5/2001 | Cheung | ................... 206/308.1 |
| 6,250,461 B1 | * | 6/2001 | Hu | .............................. 206/310 |
| 6,364,108 B1 | * | 4/2002 | Bin | ............................. 206/310 |
| 6,394,266 B1 | * | 5/2002 | Chou | ...................... 206/308.1 |
| 6,464,073 B1 | * | 10/2002 | Tang | .......................... 206/310 |
| 6,547,067 B1 | * | 4/2003 | Liu | ......................... 206/308.1 |
| 2001/0047947 A1 | * | 12/2001 | Lau | |
| 2002/0100702 A1 | * | 8/2002 | Belden, Jr. et al. | |
| 2003/0019771 A1 | * | 1/2003 | Landoli et al. | |
| 2003/0034258 A1 | * | 2/2003 | Lee | |
| 2003/0150755 A1 | * | 8/2003 | Chen | |

* cited by examiner

Primary Examiner—Jacob K. Ackun
Assistant Examiner—Faye Francis
(74) Attorney, Agent, or Firm—Rosenberg, Klein & Lee

(57) ABSTRACT

A central retaining structure for a CD box includes a base located at the center of the CD box, and having a hexagonal bearing platform protruding from the center of the base; two spaced squeezing blocks integrally formed with the hexagonal bearing platform, wherein the two spaced squeezing blocks are separated by a slit, whereby a distance thereacross is drawn closer to each other; a lip formed on an outer periphery near an upper edge of the squeezing blocks; and resilient supporting pieces extending upwardly from bottom of the squeezing blocks and formed in a resilient shape for dispersing counterforce created by the lips, wherein the each of the resilient supporting pieces comprises contact protrusions arranged a distance from the lips.

3 Claims, 7 Drawing Sheets

CD BOX WITH RETAINING STRUCTURE

BACKGROUND OF THE INVENTION

1. Field of the Invention

The present invention relates to an improved retaining center of a compact disc (CD) box and in particular, a retaining center which can securely retain a DVD/VCD/CD without fracture and which allows easy insertion and removal from the DVD/VCD/CD box.

2. Description of the Prior Art

Compact discs have become an indispensable medium for storage of information, whether as music or text, etc. Such discs are commonly stored in plastic boxes when not in use to protect the surfaces of the discs despite them generally being impervious to reduced information playback through scratching, dust, finger marks, etc. The boxes generally have a resilient center onto which the disc is secured by means of a central hole in the disc. The central hole has a diameter slightly smaller than a diameter of the center in an extended condition. An improved CD storage box has been disclosed in U.S. Pat. No. 6,250,461, issued to same applicant of the present invention. In the above-mentioned patent, referring to FIG. 1 and FIG. 1A, a retaining structure 6 comprises six resilient pieces 61 that each inclines toward the center of the retaining structure 6. Two squeezing blocks 62 protrudes upwardly from a through hole defined by the upper distal edges of the six resilient pieces 61. Lips 63 are provided at outer peripheral of the squeezing blocks 62. Referring to FIG. 2, in operation, a user guides a CD 7 onto the column such that the central hole of the CD 7 aligns with the center column. Downward pressure on the CD 7 via the user's finger tips causes the center column to compress, and thus the center column is moved to a compressed state, and the periphery of the central hole of the CD 7 passes over the lips 63. Referring to FIG. 3, the removal of the CD 7 is done in the following way: The user compresses the center column until the distance across the lips 63 is smaller than the diameter of the central hole of the CD 7, and then the CD 7 is merely pulled away from the box.

However, the above-mentioned retaining structure 6 has a shortcoming that when the CD 7 is lifted by the upward force provided by the resilient pieces 61, a downward counterforce is created due to the existence of the lips 63. In the long run, this causes deformation of the CD 7 and might affect the digital information stored on the CD 7. Further, after going through frequent operations, the resilient pieces 61 will loss their upward resilient force. In that case, the CD 7 will no longer securely fixed in the box.

Thus, there is a strong need for an improved retaining center for a CD box which does not deform the CD, and which can accurately and reliably receive a CD thereon.

SUMMARY OF THE INVENTION

Accordingly, the main objective of the invention is to provide a retaining structure for a finger-squeezing type CD storage box to solve the above-mentioned problems.

Another object of the present invention is to provide a finger-squeezing type CD storage box having a reliable retaining structure, even after going through a long-term use.

In accordance with the present invention, a central retaining structure for a CD box, from which a DVD/VCD/CD/CDR can be conveniently removed, and reliably and securely retained in the CD box without fear of the deformation of the DVD/VCD/CD/CDR, is provided. The central retaining structure comprising a base located at the center of the CD box, and having a hexagonal bearing platform protruding from the center of the base; two spaced squeezing blocks integrally formed with the hexagonal bearing platform, wherein the two spaced squeezing blocks are separated by a slit, and the two squeezing blocks can be squeezed by a user's fingers, whereby a distance thereacross is drawn closer to each other; a lip formed on an outer periphery near an upper edge of the squeezing blocks; and resilient supporting pieces extending upwardly from bottom of the squeezing blocks and formed in a resilient shape for dispersing counterforce created by the lips, wherein the each of the resilient supporting pieces comprises contact protrusions arranged a distance from the lips.

Since the contact protrusions arranged on the supporting pieces are disposed a proper distance from the lips, counterforce created by the lips no longer exists, and when the CD is restricted on the retaining structure between the lips and the supporting pieces, the supporting pieces can effectively disperse upward force exerted by the contact protrusions, as such, the CD can be gently held by the supporting pieces and do not deform, and reliable and long-term use of the retaining structure can be ensured.

The present invention further features that each of the resilient supporting pieces comprises a curved lower supporting portion extending upwardly from bottom of the squeezing blocks, the upper end of the lower supporting portion is further connected to an upper supporting portion stretching out in a curved shape, the contact protrusions are arranged along the distal edge of the upper supporting portion a distance from the lips.

The present invention further features that an enhancement rib is connected to the squeezing blocks thereby enhancing the stability of the two squeezing blocks and mounts thereof.

Other objects, advantages and novel features of the invention will become more clearly and readily apparent from the following detailed description when taken in conjunction with the accompanying drawings.

BRIEF DESCRIPTION OF THE PREFERRED EMBODIMENT

DETAILED DESCRIPTION OF THE PREFERRED EMBODIMENT

Figure 1:
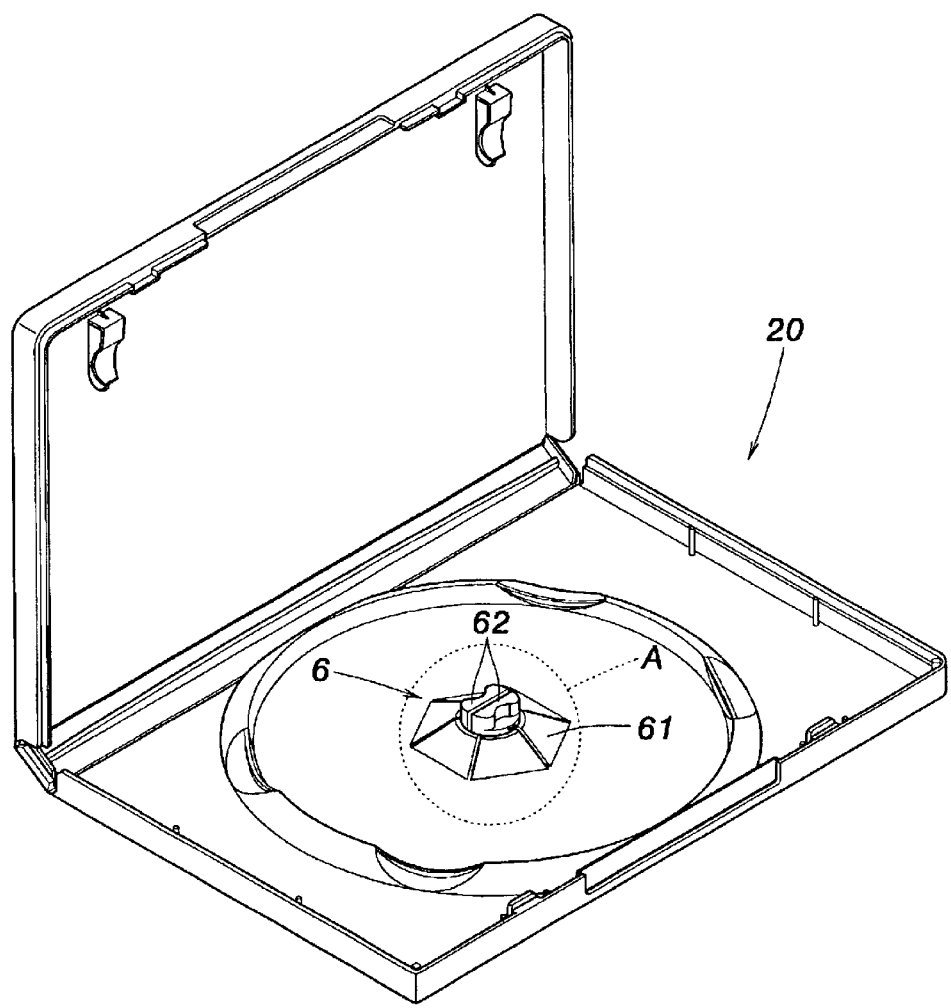
FIG. 1 is a perspective view of a CD box according to the prior art.
Figure 1A:
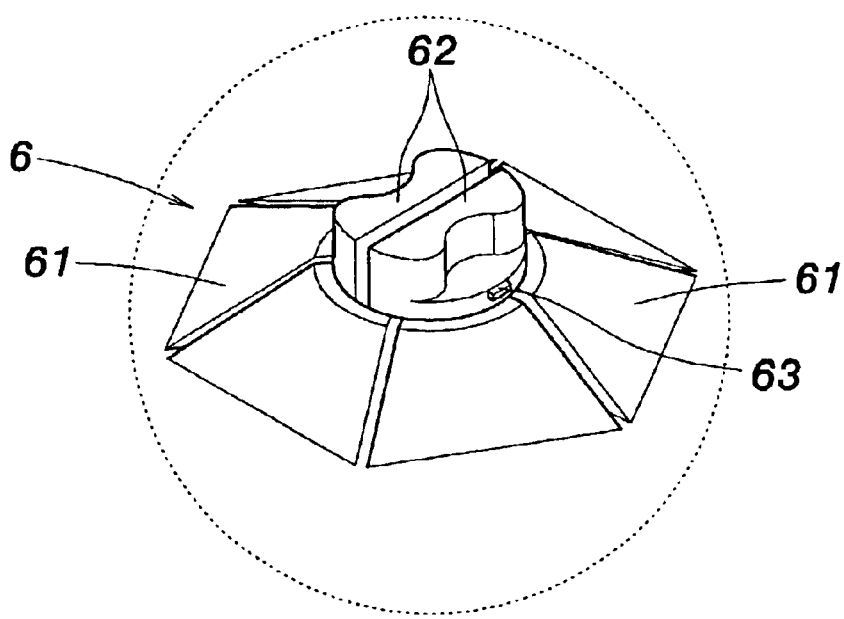
FIG. 1A is an enlarged view of the retaining structure of the CD box of FIG. 1.
Figure 2:
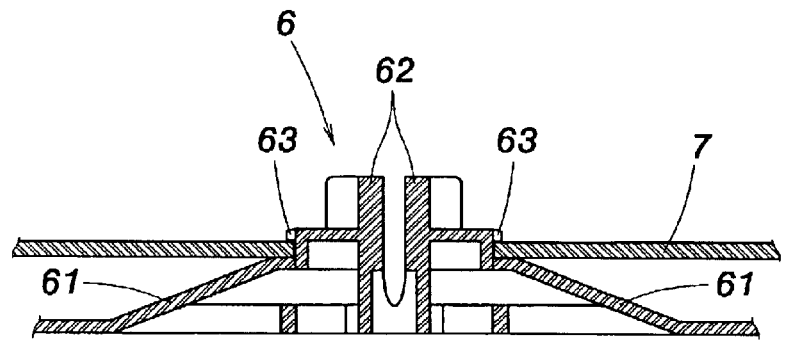
FIG. 2 is a cross-sectional view of the retaining center of FIG. 1, with a disk fitted thereover.
Figure 3:
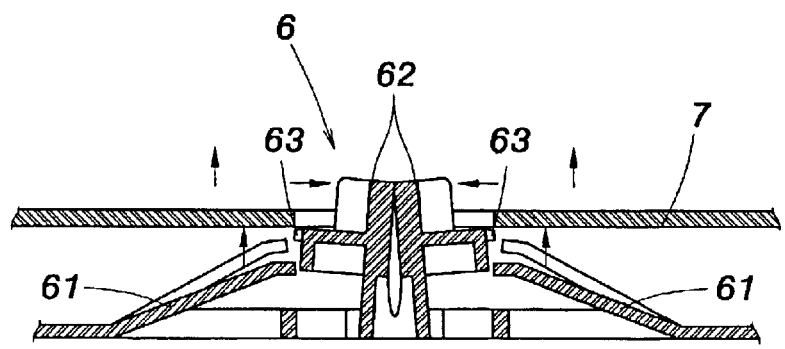
FIG. 3 is a cross-sectional view of the retaining center of FIG. 1, with the disk being removed therefrom.
Figure 4:
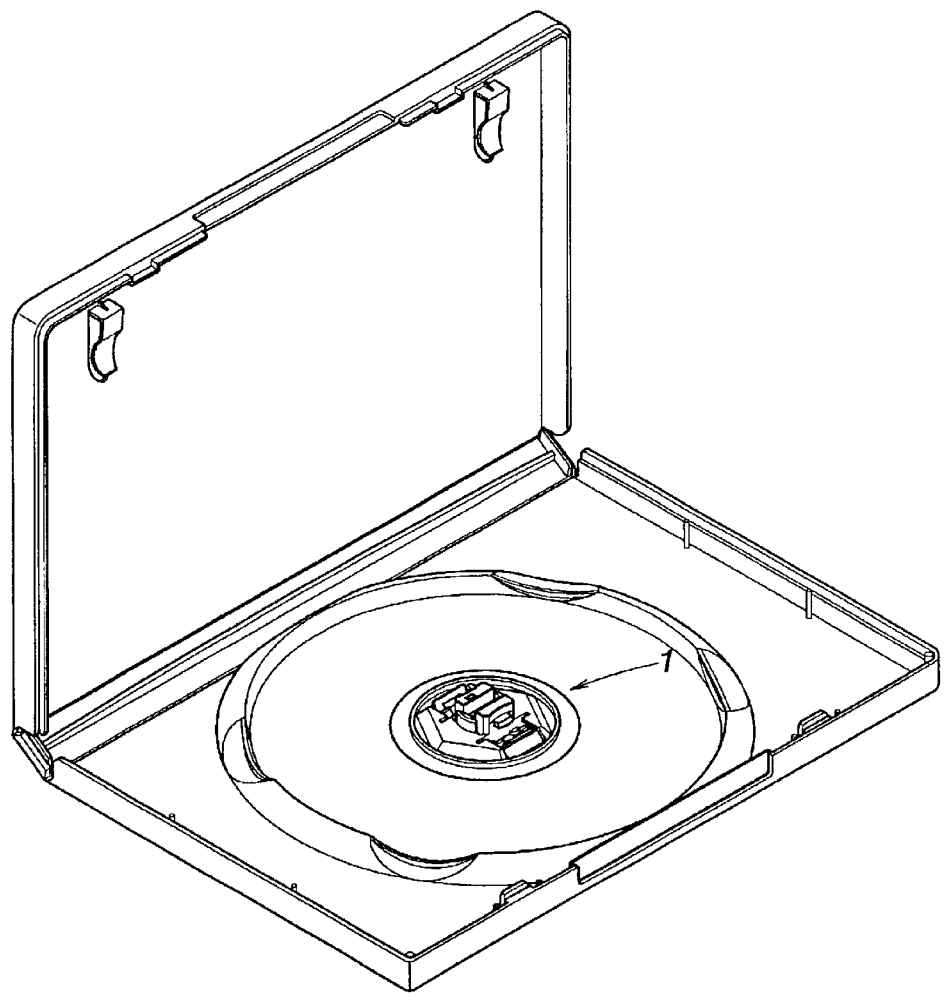
FIG. 4 is a perspective view of a CD box according to the present invention.
Figure 5:
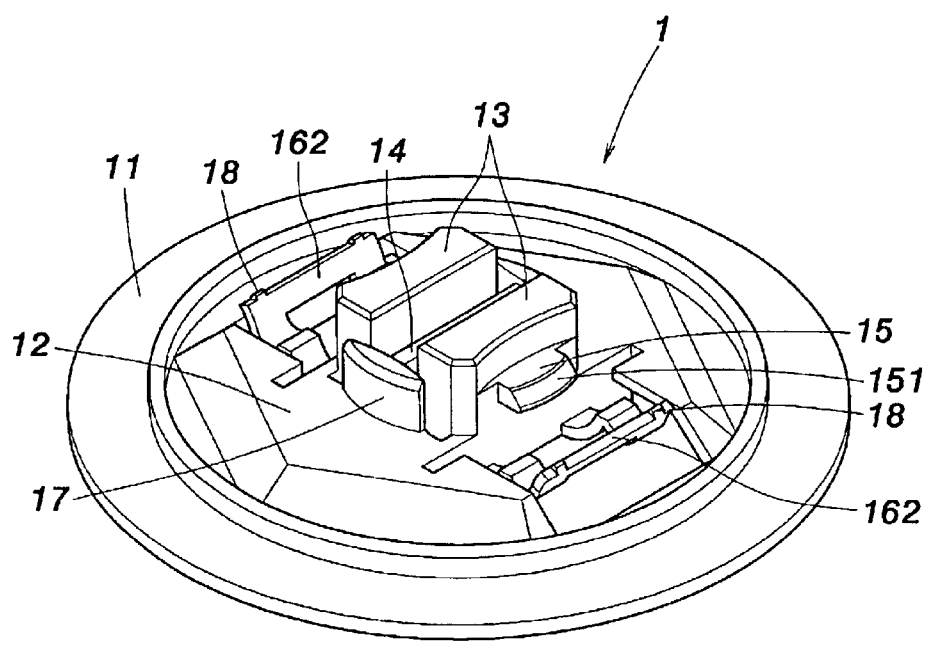
FIG. 5 is an enlarged view of the retaining structure of the CD box of FIG. 4.
Figure 6:
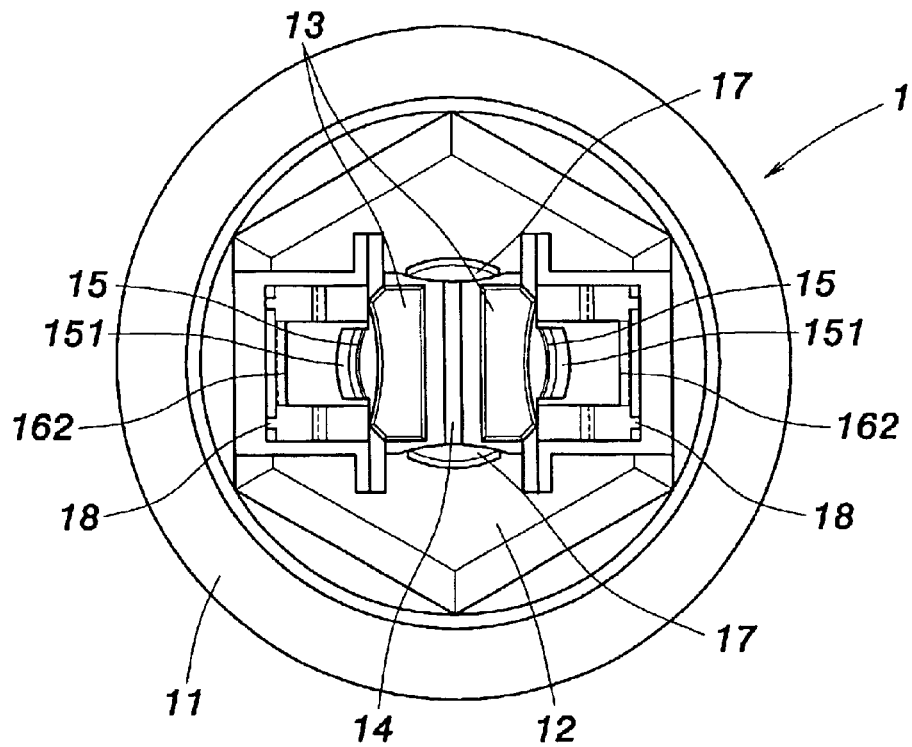
FIG. 6 is a top view of the retaining structure.

The present invention is directed to a finger-squeezing type CD storage box. Referring to FIG. 4, a CD box 10 includes a tray with a retaining structure 1 formed in a center thereof. Although the invention refers to a CD box, it is to be appreciated that boxes for other similar information discs, such as VCDs, DVDs, CDRs are equally applicable. Referring to the figures and especially FIG. 5 through FIG. 7, the retaining structure 1 comprises a base 11, a hexagonal bearing platform 12 protruding from the center of the base 11. Two spaced squeezing blocks 13 are separated by a slit. The two squeezing blocks 13 can be squeezed by a user's fingers, whereby a distance thereacross is drawn closer to each other. An enhancement rib 14 is connected to the squeezing blocks 13 thereby enhancing the stability of the two squeezing blocks 13 and mounts 17.

Figure 7:
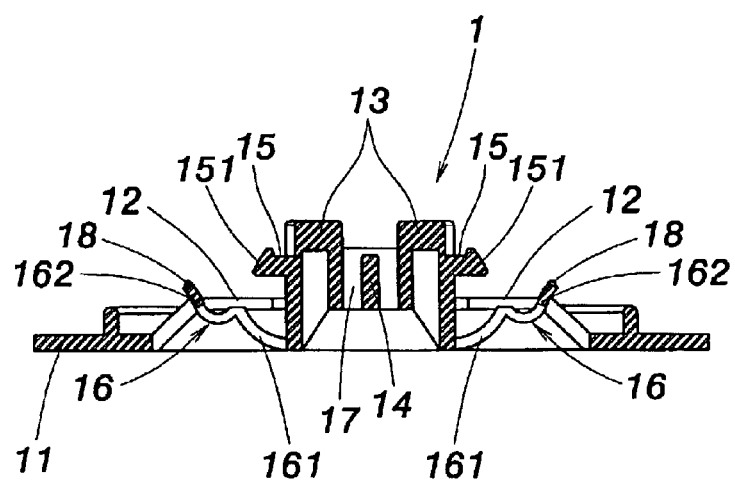
FIG. 7 is a cross-sectional view of the retaining structure.

According to the present invention, two opposite lips 15 are formed on an outer periphery near the upper edge of the squeezing blocks 13. An inclined upper surface 151 is formed at each distal end of the lips 15 to facilitate sliding of inner periphery of the CD central opening. As best seen in FIG. 7, two opposite supporting pieces 16 and contact protrusions 18 thereon are provided at the bottom of the box 10. The supporting pieces 16 extend upwardly from the bottom of the squeezing blocks 13 and are formed in a resilient shape for dispersing counterforce created by the lips 15.

Still referring to FIG. 7, each of the resilient supporting pieces 16 comprises a curved lower supporting portion 161 extending upwardly from the bottom of the squeezing blocks 13. The upper end of the lower supporting portion 161 is connected to an upper supporting portion 162 stretching out in a curved shape. The contact protrusions 18 are arranged along the distal edge of the upper supporting portion 162. With such configuration, the upper supporting portion 162 and the contact protrusions 18 can gently hold the CD 2 at a proper distance from the lips 15.

Figure 8:
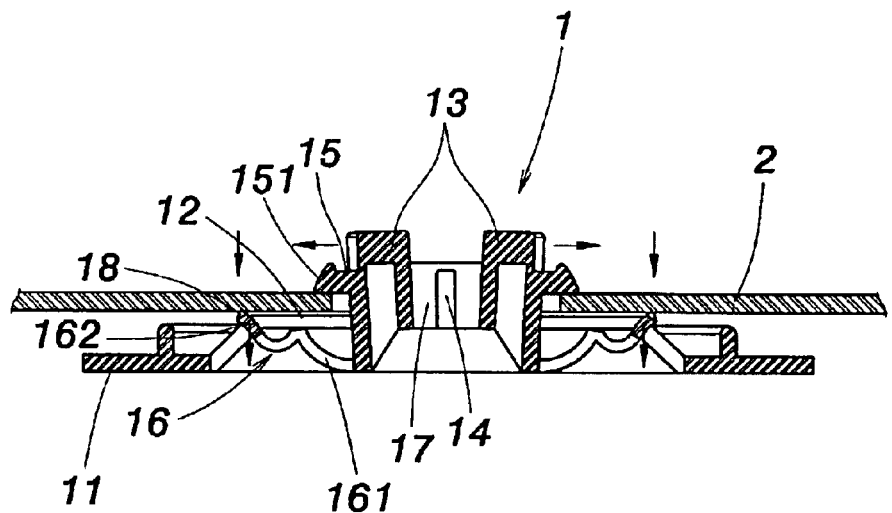
FIG. 8 is a cross-sectional view of the retaining structure, with a disk fitted thereover.
Figure 9:
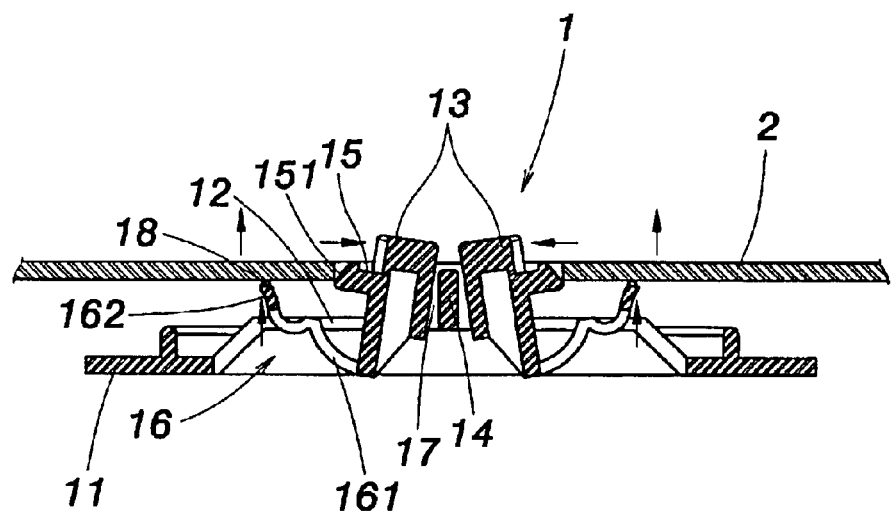
FIG. 9 is a cross-sectional view of the retaining structure, with the disk being removed therefrom.

Referring to FIG. 8, in operation, the user guides the CD 2 onto two squeezing blocks 13 of the retaining structure 1 such that the central hole of the CD 2 aligns with the mounts 17. Downward pressure exerted on the CD 2 via the user's finger tips causes the squeezing blocks 13 to compress, and thus the two squeezing blocks 13 are in a compressed state, and the periphery of the central hole of the CD 2 passes over the lips 15 by downwardly sliding through the inclined surface 151, whereby the CD 2 is securely fixed on the retaining structure 1 between the resilient supporting pieces 16 and the lips 15. Referring to FIG. 9, when one needs to take off the CD 2 from the retaining structure 1, he or she compresses the squeezing blocks 13 until the distance across the lips 15 is smaller than the diameter of the central hole of the CD 2, and then the CD 2 is merely pushed out from the box by the upward force provided by the resilient supporting pieces 16.

In this invention, the contact protrusions 18 arranged on the supporting pieces 16 are disposed a proper distance from the lips 15. Counterforce created by the lips 15 no longer exists. When the CD 2 is restricted on the retaining structure 1 between the lips 15 and the supporting pieces 16, the special structure of supporting pieces 16 consisting of the curved lower supporting portion 161 and the upper supporting portion 162 can effectively disperse the upward force exerted by the contact protrusions 18. As such, the CD 2 can be gently held by the supporting pieces 16 and do not deform. Further, the curved lower supporting portion 161 can provide reliable and long-term use of the retaining structure 1.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A central retaining structure for a disk storage box for receiving any one of a CD, a CDR, a VCD, and a DVD, the central retaining structure comprising:

a base located at a central portion of the disk box, and having a hexagonal bearing platform protruding from a center of the base;

two squeezing blocks integrally formed in one-piece formation from the hexagonal bearing platform and located at the central portion of the disk box, wherein the two squeezing blocks are separated from one another by a slit formed therebetween, and the two squeezing blocks being inwardly, squeezable;

at least one lip disposed on an outer periphery adjacent an upper edge of the two squeezing blocks; and a plurality of resilient supporting pieces respectively disposed under the two squeezing blocks, and each of the resilient supporting pieces have a contact protrusion for contacting and preventing deformation of a disk, the contact protrusions being spaced a predetermined distance from the lip, the supporting pieces gradually and effectively dispersing an upward force exerted by the contact protrusions.

2. The central retaining structure as claimed in claim 1, wherein each of the resilient supporting pieces includes a curved lower supporting portion extending upwardly from a bottom of each of the squeezing blocks, and an upper supporting portion connected to an upper end of the lower supporting portion, the upper supporting portion extending outwardly in a curved shape, and the contact protrusions being arranged along a distal edge of the upper supporting portion and spaced a distance front the lip.

3. A squeezing type disk box having a retaining structure at a central portion thereof, the retaining structure comprising a lip and a resilient supporting piece for restricting a disk therebetween; wherein the resilient supporting piece includes a curved lower supporting portion extending upwardly from a bottom of a pair of squeezing block, an upper supporting portion being connected on an opposing upwardly extending end of the lower supporting portion, and a plurality of contacts contact protrusion disposed alone a distal edge of the upper supporting portion and spaced from the lip, wherein the upper supporting portion extends outwardly in a curved shape for softly supporting a disk.

* * * * *